United States Patent [19]

Taniguchi et al.

[11] 3,821,719

[45] June 28, 1974

[54] SEMICONDUCTOR MEMORY

[75] Inventors: Kenji Taniguchi; Ichiro Imaizumi; Atsuo Hotta, all of Kokufuji, Japan

[73] Assignee: Hitachi, Ltd., Tokyo, Japan

[22] Filed: Apr. 27, 1973

[21] Appl. No.: 355,271

Related U.S. Application Data

[63] Continuation of Ser. No. 151,222, June 9, 1971, abandoned.

[30] Foreign Application Priority Data

June 12, 1970 Japan ................................ 45-50256

[52] U.S. Cl. ........... 340/173 FF, 307/238, 307/291, 307/299 A, 340/173 CP

[51] Int. Cl. ... H03k 3/286, G11c 11/40, G11c 7/00

[58] Field of Search ................ 340/173 FF, 173 CP; 307/238, 289, 291, 299 A

[56] References Cited

UNITED STATES PATENTS

| | | | |
|---|---|---|---|
| 3,389,383 | 6/1968 | Burke | 340/173 FF |
| 3,467,952 | 9/1969 | Shiraishi | 340/173 FF |
| 3,505,573 | 4/1970 | Wiedmann | 340/173 FF |
| 3,537,078 | 10/1970 | Pomeranz | 340/173 FF |
| 3,541,531 | 11/1970 | Iwersen | 340/173 FF |
| 3,618,046 | 11/1971 | Bryant | 340/173 FF |
| 3,626,390 | 12/1971 | Chang | 340/173 FF |
| 3,636,377 | 1/1972 | Ecenomopoulos | 340/173 FF |

OTHER PUBLICATIONS

Wiedmann, Monolithic Circuit with Pinch Resistor, 2/71, IBM Technical Disclosure Bulletin, Vol. 13, No. 9, p. 2,469.

Gardner, Storage Cell, 11/66, IBM Technical Disclosure Bulletin, Vol. 9, No. 6, p. 702.

S. Wiedmann, Monolithic Memory Cell with Junction FET Loads, 7/70, IBM Technical Disclosure Bulletin, Vol. 13, No. 2, pp. 477–478.

Gaensslen, FET Memory Cell Using Schottky Diodes as Load Devices, 7/70, IBM Technical Disclosure Bulletin, pp. 302–303, Vol. 13, No. 2.

*Primary Examiner*—Bernard Konick
*Assistant Examiner*—Stuart N. Hecker
*Attorney, Agent, or Firm*—Craig and Antonelli

[57] ABSTRACT

A semiconductor memory comprising a plurality of memory cells, each cell including a pair of two-emitter transistors each having the collector connected to the base of the other transistor in the pair, one emitter connected to like emitter of the other transistor and to a common emitter bias terminal through an impedance element, and the other emitter connected to a corresponding one of bit drive lines in pair. The collectors of the transistors in pair are connected through respective switched impedance elements to a common collector voltage terminal, the respective switched impedance elements offering a small impedance when the collector voltage is at a high level and a large impedance when the collector voltage is at a low level.

8 Claims, 11 Drawing Figures

INVENTORS

KENJI TANIGUCHI,
ICHIRO IMAIZUMI AND
ATSUO HOTTA

BY Craig, Antonelli & Hill
ATTORNEYS

INVENTORS
KENJI TANIGUCHI,
ICHIRO IMAIZUMI AND
ATSUO HOTTA
BY Craig, Antonelli & Hill
ATTORNEYS

INVENTORS

KENJI TANIGUCHI,
ICHIRO IMAIZUMI AND
ATSUO HOTTA

BY Craig, Antonelli & Hill
ATTORNEYS

INVENTORS

KENJI TANIGUCHI,
ICHIRO IMAIZUMI AND
ATSUO HOTTA

BY Craig, Antonelli & Hill
ATTORNEYS

INVENTORS

KENJI TANIGUCHI,
ICHIRO IMAIZUMI AND
ATSUO HOTTA

BY Craig, Antonelli & Hill
ATTORNEYS

SEMICONDUCTOR MEMORY

This application is a continuation of application Ser. No. 151,222, filed June 9, 1971, now abandoned.

BACKGROUND OF THE INVENTION

1. Field of the Invention

This invention relates to semiconductor memories and, more particularly, to improvements of a memory cell employing two transistors each having a plurality of emitters.

2. Description of the Prior Art

The memory cell employing two multi-emitter transistors occupies extremely small area in an integrated circuit, so that it is suitable for organizing a semiconductor memory having a large capacity.

However, in the typical prior-art multi-emitter transistor memory cell, the resistance of the collector load is designed to be constant. Therefore, an intent to increase the speed of memory operation by increasing the cell current $I_R$ in a memory cell when it is in selected state results in increased cell current $I_{ST}$ in non-selected state, thus increasing the power consumption.

In a typical static MOS memory cell, the current ratio $I_R/I_{ST}$ can be increased by so arranging as to switch the load impedance of the cell between values for the selected state and non-selected state. With this type of memory cells, it has been possible to achieve low power consumption and a comparatively high operation speed of memory.

It has also been proposed to increase the current ratio $I_R/I_{ST}$ of the memory cell consisting of two multi-emitter transistors by switching the collector load resistance of the cell between values for the selected state and non-selected state of the cell. This proposal, however, requires impressing an address pulse on at least the common emitter terminal of the memory cell. Therefore, in the selected state of the memory cell, at least one of the paired emitters connected to respective bit lines must carry current. This is a disadvantage in that it is impossible to sufficiently reduce power consumption in the circuit associated to a matrix arrangement organized with these memory cells, as will be described hereinafter in connection with FIG. 10 of the accompanying drawing.

In some of the prior-art memory cells of the kind mentioned above, address pulse is also applied to the collector terminals in order to provide low collector impedance of the cell when the address pulse is impressed on the common emitter terminal. This, however, requires a complicated circuit associated to the memory cell matrix because of two drive points for each memory cell.

SUMMARY OF THE INVENTION

The present invention provides a novel bipolar type memory cell which can obviate the above drawbacks.

It is an object of the invention to provide a semiconductor memory comprising one or more memory cells each of which is selected by applying an address pulse to the collectors thereof so as to operate at a high speed with low power consumption.

The memory cell according to the invention essentially consists of two multi-emitter transistors each having a base, a collector connected to the base of the other transistor respectively and to a collector voltage source through a switched impedance element, two or more emitters at least one of which is connected to the corresponding emitter of the other transistor and connected in common to an emitter bias terminal through a series impedance, and the remainder of the emitters being connected to the external circuitry, wherein the impedance of the switched impedance element is switched between values for the selected state and non-selected state of the memory cell.

DESCRIPTION OF THE PREFERRED EMBODIMENTS

Figure 1:
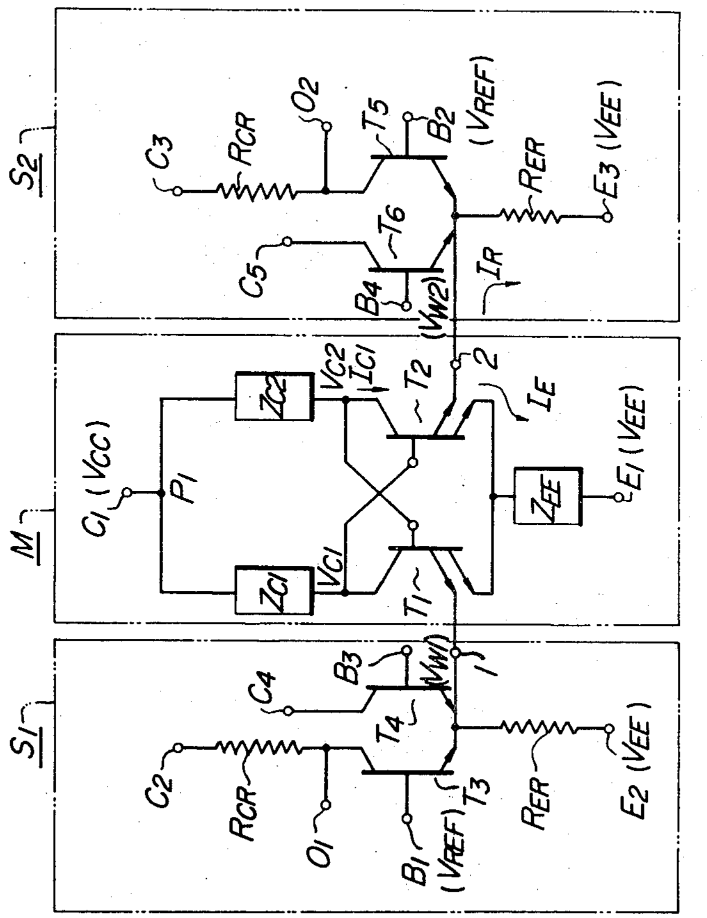
FIG. 1 is a circuit diagram illustrating the principles underlying the invention.

FIG. 1 shows the principles underlying the invention. Referring to the Figure, reference character M generally designates a memory cell employing two multi-emitter transistors $T_1$ and $T_2$ each of which is illustrated to have two-emitters as an example. The collectors of the transistors $T_1$ and $T_2$ are connected to respective switched impedance elements $Z_{C1}$ and $Z_{C2}$ as loads. The collector of each of the transistors $T_1$ and $T_2$ is connected to the base of the other transistor. The transistors $T_1$ and $T_2$ have respective first emitters connected to each other and to an emitter bias terminal $E_1$ through an impedance element $Z_{EE}$ and respective second emitters connected to respective write/read amplifiers which are generally indicated as $S_1$ and $S_2$ and will be described hereinafter. The second emitters are also connected to like second emitters of a plurality of transistors forming other memory cells in a matrix not shown.

The write/read amplifier $S_1$ comprises two transistors $T_3$ and $T_4$ having their emitters commonly connected to the second emitter of the multi-emitter transistor $T_1$ of the memory cell M and to an emitter bias terminal $E_2$ through a resistor $R_{ER}$ for determining the read current in the memory cell M. Likewise, the write/read amplifier $S_2$ comprises two transistors $T_5$ and $T_6$ having their emitters commonly connected to the second emitter of the multi-emitter transistor $T_2$ of the memory cell M and to an emitter bias terminal $E_3$ through a resistor $R_{ER}$ for determining the read current in the memory cell M. The transistors $T_3$ and $T_5$ have their respective collectors connected through respective resistors $R_{CR}$ to respective collector bias terminals $C_2$ and $C_3$. Output terminals $O_1$ and $O_2$ are also connected to the collectors of the transistors $T_3$ and $T_5$. A reference voltage $V_{REF}$ is impressed on the bases $B_1$ and $B_2$ of the transistors $T_3$ and $T_5$. Input signals $V_{W1}$ and $V_{W2}$ carrying information to be written-in are impressed on the bases $B_3$ and $B_4$ of the transistors $T_4$ and $T_6$. The transistors $T_4$ and $T_6$ have their respective collectors connected to respective collector bias terminals $C_4$ and $C_5$, which may or may not be commonly connected to the terminals $C_2$ and $C_3$.

Figure 2A:
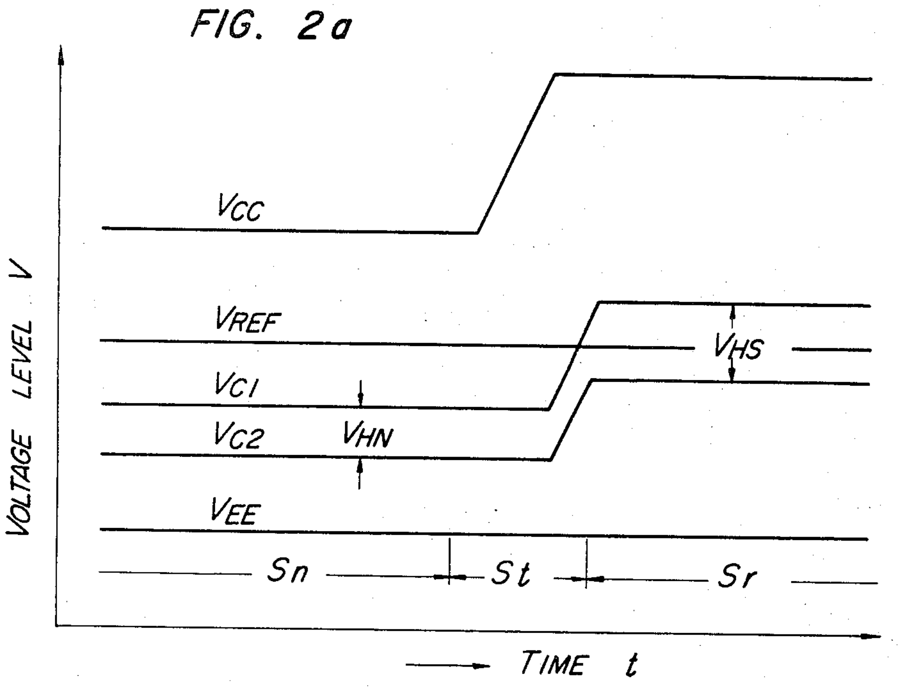
FIGS. 2*a* and 2*b* show voltage waveforms and current waveforms illustrating the operation of the circuit of FIG. 1.

FIG. 2 illustrates the operation of the construction described above. The emitter bias voltage $V_{EE}$ is made constant as shown in FIG. 2*a*. For the selective driving of the memory cell, the collector voltage $V_{CC}$ is made to assume a low level during the non-selected state $S_n$ of the memory cell and a high level during the selected state $S_r$ of the cell. During the non-selected state $S_n$, the collector voltages $V_{C1}$ and $V_{C2}$ on the transistors $T_1$ and $T_2$ ($V_{C1} > V_{C2}$ when the transistor $T_2$ carries current) are lower than the reference voltage $V_{REF}$ applied to the write/read amplifier transistor bases $B_1$ and $B_2$. Thus, in this state no current flows through the second emitter of the transistor 2, so that current $I_{ER}$ flowing through the resistor $R_{ER}$ in the write/read amplifier $S_2$ is constituted by the current through the resistor $R_{CR}$ and transistor $T_5$ alone, and the output voltage $V_{OUT}$ appearing at the output terminal $O_2$ at the collector of the transistor $T_5$ assumes a low level given as $$V_{OUT} = V_{CC} - \alpha R_{CR} I_{ER} \quad (1)$$

where $\alpha$ is current amplification factor of transistor $T_5$ with base grounded. Similarly, the voltage appearing at the output terminal $O_1$ at the collector of the transistor $T_3$ assumes a low level.

When the memory cell M is set in its selected state $S_r$, that is, when the voltage $V_{CC}$ at the terminal $C_1$ is switched to a high level, no current flows through terminal 1 since the collector voltage $V_{C2}$ on the transistor $T_2$ is lower than the reference voltage $V_{REF}$, but the collector voltage $V_{C1}$ on the transistor $T_1$ becomes higher than the reference voltage $V_{REF}$, causing current $I_R$ to pass through terminal 2. The current $I_R$ thus caused is substantially equal to the difference between the collector current $I_C$ and emitter current $I_E$ in the transistor $T_2$. As this current $I_R$ flows through the resistor $R_{ER}$, the current through the resistor $R_{CR}$ is reduced to increase the output voltage $V_{OUT}$ at the output terminal $O_2$. As a result, an information 1 is read out. On the other hand, since the transistor $T_1$ remains cut off, the output voltage $V_{OUT}$ at the output terminal $O_1$ of the amplifier $S_1$ remains at a low level with change in the collector voltage $V_{CC}$.

In the non-selected state $S_n$ of the memory cell, the switched impedance elements $Z_{C1}$ and $Z_{C2}$ offer high impedances (including the case $Z_{C1} = Z_{C2}$) to restrict the collector current $I_{ST}$ to an extremely low level, thus minimizing power consumption. On the other hand, in the selected state $S_r$ the impedance of the switched impedance elements $Z_{C1}$ and $Z_{C2}$ is low, so that the level of the read current $I_R$ is made very high. Thus, the memory cell can provide for a high speed of memory operation. Generally, the switched impedance elements $Z_{C1}$ and $Z_{C2}$ may offer different impedances when the memory cell holds information stored, that is, when the memory cell is receiving a source voltage. Since the impedance of the switched impedance elements $Z_{C1}$ and $Z_{C2}$ is reduced upon selection of the memory cell, the switching speed of transition between the selected state and non-selected state may be improved. To summarize, the performance of the memory cell such as power consumption and operation speed may be widely improved.

In the fundamental memory cell construction of FIG. 1, the impedance values of the switched impedance elements connected to the collectors of the transistors $T_1$ and $T_2$ are switched between the non-selected state and selected state, thereby widely improving the memory cell performance compared to the prior art.

Figure 3:
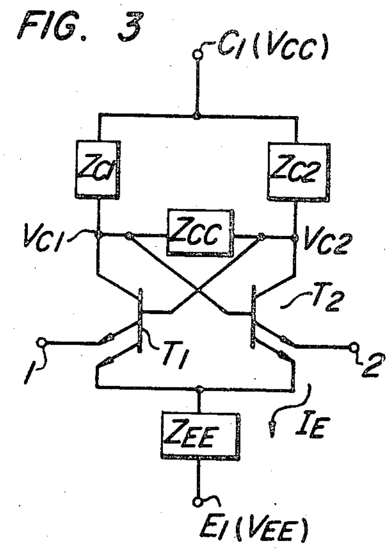
FIGS. 3 and 4 are schematics showing other fundamental circuit constructions than that of FIG. 1.

FIG. 3 shows another memory cell, in which a coupling impedance element $Z_{CC}$ is provided between the collectors of the transistors $T_1$ and $T_2$ for the purpose of preventing saturation of the transistors and reducing the amplitude of the address pulse. The impedance of the coupling impedance element $Z_{CC}$ may be either fixed or variable.

Figure 4:
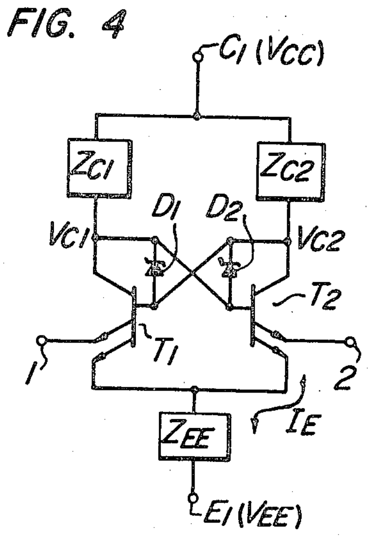

FIG. 4 shows a further modified memory cell, in which Schottky barrier diodes $D_1$ and $D_2$ are connected between collector and base of the respective transistors $T_1$ and $T_2$. This circuit, though rather difficult to fabricate, is effective in the aspect of preventing the saturation of the transistors $T_1$ and $T_2$. It operates under the same principles as for the circuit of FIG. 1.

Figure 5:
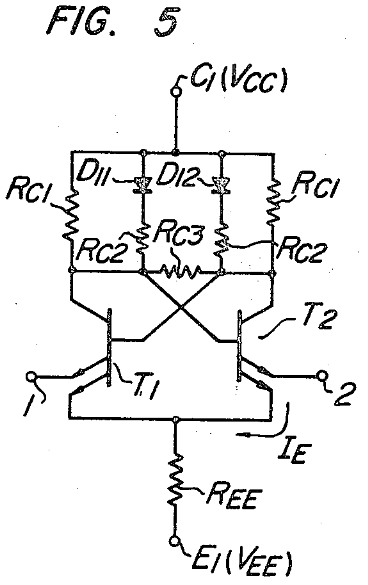
FIGS. 5 to 9 show part of different embodiments of the invention.

FIG. 5 shows one embodiment of the invention. In the Figure, and in FIGS. 6 to 9, corresponding parts to those in FIG. 1 are designated by like reference characters. In this circuit, a high value resistor $R_{C1}$ is connected in parallel with a series circuit of a diode $D_{11}$ and a low value resistor $R_{C2}$ and they constitute the switched impedance element $Z_{C1}$ in FIG. 1, and another high value resistor $R_{C1}$ is connected in parallel with a series circuit of a diode $D_{12}$ and another low value resistor $R_{C2}$ and they constitute the switched impedance element $Z_{C2}$ in FIG. 1. A high value resistor $R_{EE}$ constitutes the impedance element $Z_{EE}$ in FIG. 1. A resistor $R_{C3}$ corresponds to the coupling impedance element $Z_{CC}$ for preventing saturation shown in FIG. 3. It is not an essential element.

In this circuit, the collector voltage $V_{CC}$, emitter voltage $V_{EE}$, resistances of the resistors $R_{C1}$, $R_{C2}$, $R_{C3}$ and $R_{EE}$ and diode characteristics of the diodes $D_{11}$ and $D_{12}$ are selected such that, in the non-selected state of the memory, the diodes $D_{11}$ and $D_{12}$ are in the cut-off state or nearly cut off, that is, the voltages across the diodes $D_{11}$ and $D_{12}$ are below the threshold voltage, and, in the selected state, either one or both of the diodes $D_{11}$ and $D_{12}$ carry current, that is, the voltage across either one or both of the diodes $D_{11}$ and $D_{12}$ is above the threshold voltage. Thus, in the non-selected state, the emitter current $I_{ST}$ is held at a low level determined by the high value resistors $R_{C1}$, $R_{C2}$ and $R_{EE}$, while, in the selected state, a large read current $I_R$ as determined by the forward characteristic of the diodes $D_{11}$ and $D_{12}$ and the low value resistor $R_{C2}$ flows in the circuit.

Figure 2B:
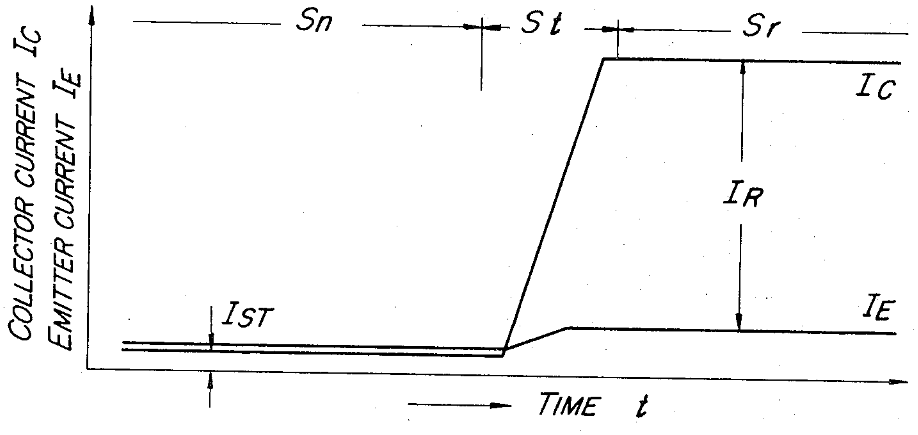

The voltage and current waveforms in the non-selected state and selected state of the memory cell are basically the same as those shown in FIGS. 2*a* and 2*b*.

Figure 6:
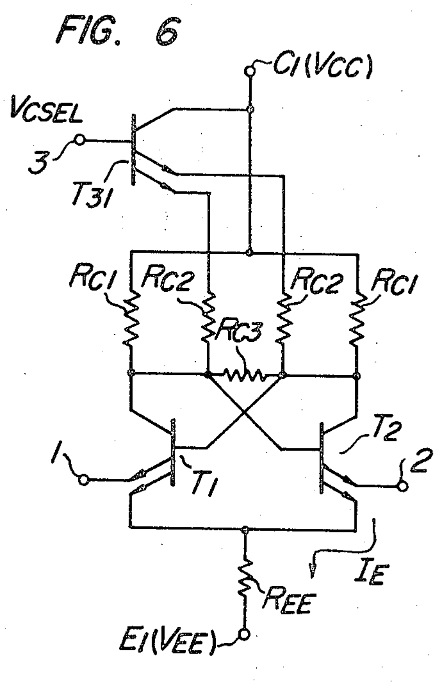
Figure 10:
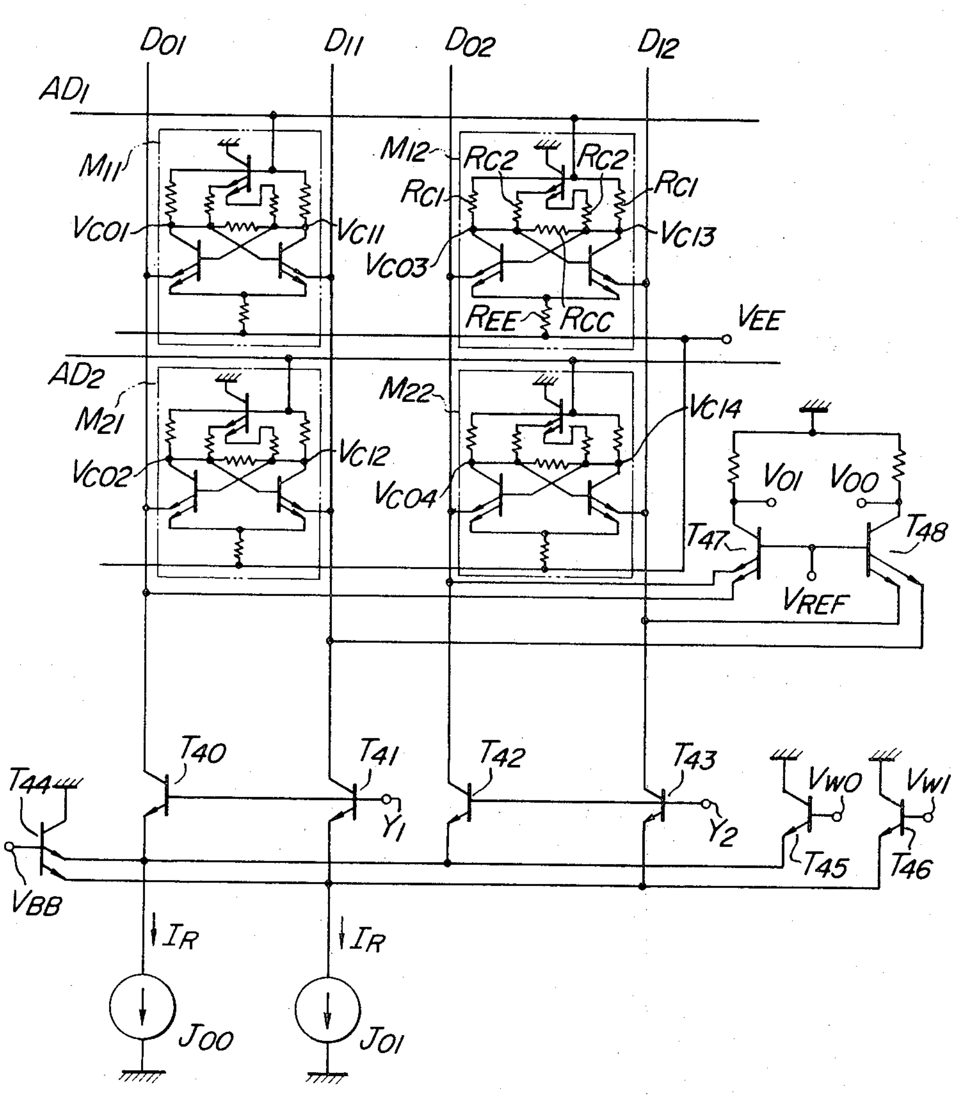
FIG. 10 is a circuit diagram showing another embodiment of the invention.

FIG. 6 shows another embodiment of the invention. In this circuit, a multi-emitter transistor $T_{31}$ replaces the diodes $D_{11}$ and $D_{12}$ in the preceding embodiment of FIG. 5. An address voltage impressed on a base terminal 3 leading to the transistor $T_{31}$ effects the switching between the high value resistor $R_{C1}$ and low value resistor $R_{C2}$ for the non-selected state and selected state. The address voltage applied on the terminal 3, therefore, is such that the transistor $T_{31}$ is cut off during the non-selected state and it carries current during the selected state. The collector voltage $V_{CC}$ impressed on the collector terminal $C_1$ may be either fixed or variable. If it is variable, the collector terminal $C_1$ may be connected to the base terminal 3, and in this case, the collector of the transistor $T_{31}$ is connected to a separate d-c power supply, as shown in FIG. 10. The multi-emitter transistor $T_{31}$ in this embodiment may of course be used in lieu of the diodes $D_{11}$ and $D_{12}$ shown in FIG. 5.

Figures 7, 8, 9:
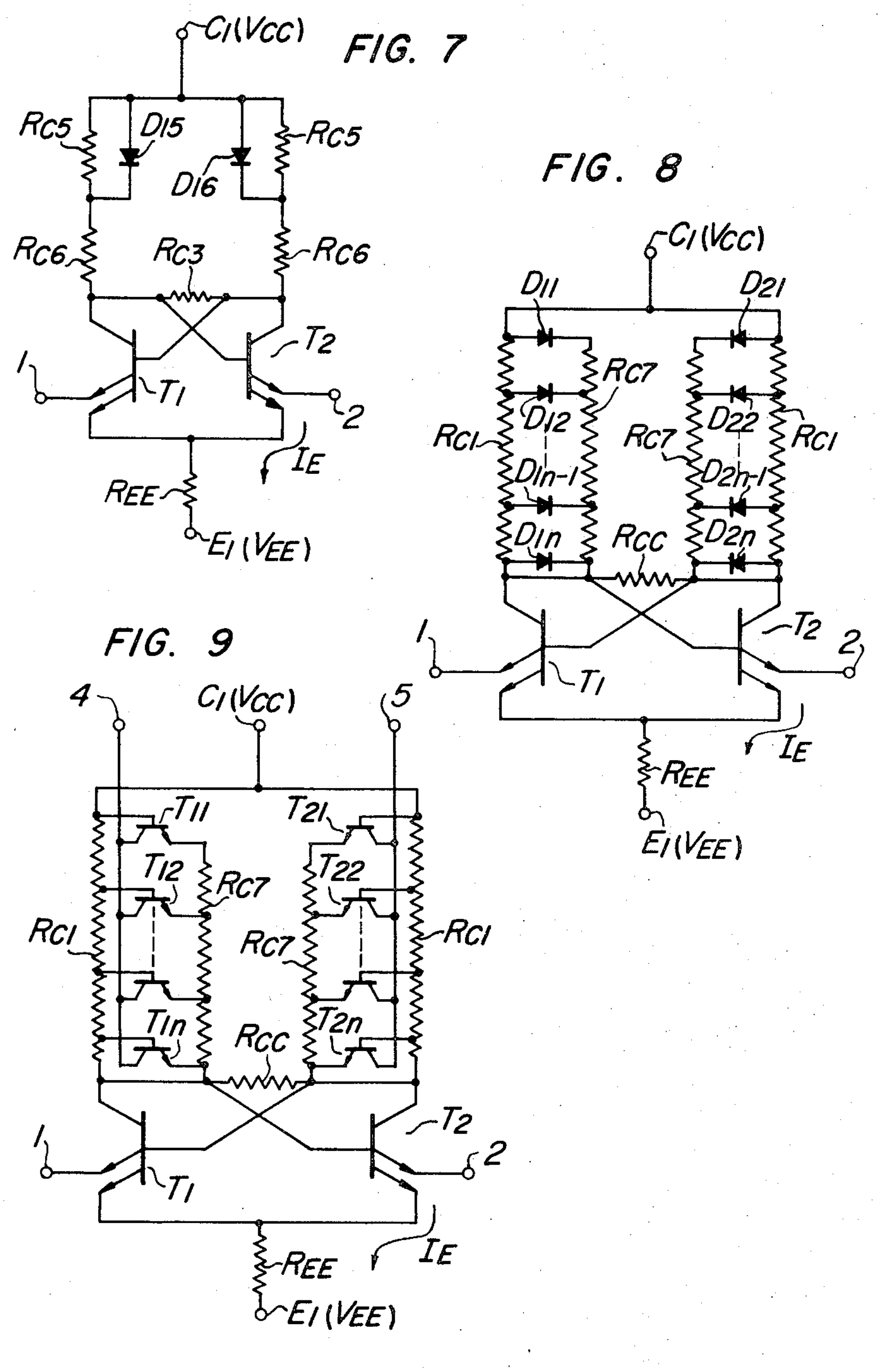

FIG. 7 shows a further embodiment of the invention. In this circuit, a series circuit of a high value resistor $R_{C5}$ and a low value resistor $R_{C6}$ and a diode $D_{15}$ in parallel with the resistor $R_{C5}$ constitute the switched impedance element as the collector load of the transistor $T_1$, and another series circuit of like components and a diode $D_{16}$ in parallel with resistor $R_{C5}$ constitute the switched impedance element as the collector load of the transistor $T_2$.

The circuit paramenters of this circuit are selected such that, in the non-selected state the diodes $D_{15}$ and $D_{16}$ are cut off or nearly cut off while in the selected state either one or both of the diodes $D_{15}$ and $D_{16}$ carry current. Thus, the current in the non-selected state is determined by $R_{C5} + R_{C6} \cong R_{C5}$ (since $R_{C5} >> R_{C6}$), while the current in the selected state is determined by the diodes $D_{15}$ and $D_{16}$ and the low value resistor $R_{C6}$. The memory cell of this embodiment, therefore, operates entirely in the same manner as the memory cells of the preceding embodiments.

FIGS. 8 and 9 show still further embodiments of the invention. In the embodiment of FIG. 8, a circuit consisting of parallel resistors $R_{C1}$ and $R_{C7}$ and a plurality of diodes $D_{11}, D_{12}, \ldots, D_{1n}$ connected in a distributed fashion between the parallel resistors constitutes the switched impedance element as the collector load of the transistor $T_1$, and a similar circuit consisting of like parallel resistors $R_{C1}$ and $R_{C7}$ and a plurality of diodes $D_{21}, D_{22}, \ldots, D_{2n}$ constitutes the switched impedance element as the collector load of the transistor $T_2$. The resistors $R_{C7}$ have one end connected to the collector of the respective transistors $T_1$ and $T_2$ and the other end connected to the respective diodes $D_{11}$ and $D_{12}$.

In this circuit, the resistances, diode characteristics and voltage levels applied are selected such that, in the non-selected state of the memory cell most of the diodes $D_{11}, D_{12}, \ldots, D_{1n}$, and $D_{21}, D_{22}, \ldots, D_{2n}$ are cut off or nearly cut off, while in the selected state at least one of the diodes nearest to the collector terminal $C_1$, namely either one or both of the diodes $D_{11}$ and $D_{21}$, carry current.

In the embodiment of FIG. 9, transistors $T_{11}, T_{12}, \ldots, T_{1n}$ and $T_{21}, T_{22}, \ldots, T_{2n}$ are used in lieu of the diodes $D_{11}, D_{12}, \ldots, D_{1n}$, and $D_{21}, D_{22}, \ldots, D_{2n}$ in the preceding embodiment of FIG. 8. These transistors have their collectors connected to respective terminals 4 and 5, which may be connected either to the terminal $C_1$ or to a separate constant voltage source.

The switched element, which has diodes as in FIG. 8 or transistors as in FIG. 9 connected in a distributed fashion between two parallel resistors offering different impedances, requires an extremely small area when it is integrated into a semiconductor integrated circuit.

In the preceding embodiments, the common emitter connection between the flip-flop transistors $T_1$ and $T_2$ is connected to the emitter bias terminal $E_1$ through an impedance element $Z_{EE}$, whereby a memory cell having switched load impedance elements selectable by a collector driving method may be formed. Where the common emitter connection is connected through the impedance element $Z_{EE}$ to the emitter bias terminal $E_1$, it is possible to utilize a semiconductor diffusion region as the impedance element $Z_{EE}$. In such case, metal film lead between the common emitter connection point and the emitter bias terminal may be reduced or eliminated, thus increasing the degree of integration of the integrated circuit, which is advantageous from the standpoint of economy.

A memory constructed with the above-stated memory cells having switched load impedance elements selectable by collector driving provides an advantage of low power consumption, which cannot be achieved with memory cells of a similar type but requiring the address pulse impression on the common emitter connection.

FIG. 10 shows a memory cell matrix providing the advantage of low power consumption. The matrix consists of memory cells $M_{11}, \ldots, M_{22}$; generally, there are *n* by *m* memory cells in a matrix, and only four memory cells are shown in this example. The memory cells in this matrix are a modification of the memory cell of FIG. 6. These memory cells are by no means limitative, but other memory cells may of course be used. Characters $AD_1$ and $AD_2$ designate X address lines, characters $D_{01}$, $D_{11}$, $D_{02}$ and $D_{12}$ designate bit drive lines, and characters $J_{00}$ and $J_{01}$ designate current sources to provide write or read drive current $I_R$.

The bit drive lines $D_{01}$, $D_{11}$, $D_{02}$ and $D_{12}$ are selected by transistors $T_{40}$, $T_{41}$, $T_{42}$ and $T_{43}$ having their base connected to respective Y address terminals $Y_1$ and $Y_2$, on which Y address select voltage is impressed. The memory cells $M_{11}$, $M_{12}$, $M_{21}$ and $M_{22}$ are selected when drive voltage appears on the corresponding one of the X address lines $AD_1$ and $Ad_2$ and on the corresponding one of the T address terminals $Y_1$ and $Y_2$. The reference level of the Y address select voltage, which is impressed on the base terminals $Y_1$ and $Y_2$ for the respective pairs of Y address transistors $T_{40}$, $T_{41}$, $T_{42}$, $T_{43}$, is determined by the voltage $V_{BB}$ applied to the base of a two-emitter transistor $T_{44}$ having one emitter connected to the emitter of the transistors $T_{40}$ and $T_{42}$ and the other emitter connected to the emitter of the transistors $T_{41}$ and $T_{43}$. The two emitters of the transistor $T_{44}$ are also connected to the respective emitters of transistors $T_{45}$ and $T_{46}$. The transistors $T_{45}$ and $T_{46}$ serve to prevent the current $I_R$ from the current source $J_{00}$ or $J_{01}$ from flowing into one of the selected bit drive lines in pair in dependence upon whether the base voltages $V_{W0}$ and $V_{W1}$ on the transistors $T_{45}$ and $T_{46}$ are higher or lower than the T address select voltage impressed on the Y address terminal $T_1$ or $T_2$. Transistors $T_{47}$ and $T_{48}$ constitute a sense amplifier, which reads out the memory content of the selected memory cell in terms of its collector output voltages $V_{01}$ and $V_{00}$.

If voltage of high level prevails at terminal $Y_1$ and voltage of low level at terminal $Y_2$, the bit drive lines $D_{01}$ and $D_{11}$ in pair are selected, while the transistors $T_{42}$ and $T_{43}$ are non-conductive. At this time, if voltage of high level appears on the X address line $AD_1$, the second emitters in the memory cell $M_{12}$ remain non-conductive. By virture of the emitter resistor $R_{EE}$ in each memory cell in the matrix of FIG. 10, always one of the first emitters in pair carries current. Thus, even if the second emitters in a selected memory cell remain non-conductive, the memory content in the selected memory cell will not be destroyed. In the conventional memory cell of the emitter address drive type, if both the second emitters remain non-conductive when it is selected the memory content would be destroyed. According to the invention, by virture of the emitter impedance $Z_{EE}$ it is not necessary to provide the current sources $J_{01}$ and $J_{00}$ as shown in FIG. 10 for each column in the matrix. Thus, it will be seen that the circuitry associated to the memory cell matrix may be simplified and the power consumption of the memory may be reduced.

For reducing the selected state collector impedance of a memory cell consisting of two multi-emitter transistors, it can be considered to connect diodes between the collector drive voltage terminal and the respective collectors in the cell. By so doing, the saturation of the flip-flop transistors may be prevented. In such case, however, if both the diodes connected to the respective collectors become conductive, the collector potentials on both sides of the flip-flop becomes substantially equal, so that the memory content will apparently be destroyed. According to the invention, the impedance switching diodes or transistors in the memory cell are arranged such that both the collector load impedances assume low values other than zero when both the diodes or transistors are triggered upon selection of the cell; for instance, a low value resistor is connected in series with the diode or the emitter of the transistor in the collector load. This feature enables increasing the current ratio $I_R/I_{ST}$ more than ten times as large as that heretofore achievable.

Although in the foregoing embodiments suitable combinations of resistors and diodes or transistors are used as the switched impedance elements, it will be apparent that other semiconductor elements such as a two-terminal switched impedance element, for instance a PNPN element, and a field effect transistor may also be used to form the switched impedance element.

As has been described in the foregoing, according to the invention the impedance of the collector leads of the flip-flop transistors in the memory cell is made switchable for the non-selected state and selected state, so that it is possible to extremely reduce power consumption of the memory cell during the non-selected state and increase the operating speed by increasing the read-out current during the selected state. Thus, a semiconductor memory organized from these memory cells can provide outstandingly improved performance.

The foregoing description has indicated that the collector bias voltage $V_{cc}$ is merely switched from a low level to a high level and vice versa but this may also include use of an address signal having a high level and a low level incorporated or superimposed on the constant level collector bias voltage.

What is claimed is:

1. In a semiconductor memory comprising:

a. at least one memory cell including
   1. a pair of double-emitter transistors each having a collector, a base and first and second emitters, the collector of each one of said pair of transistors being connected to the base of the other, respectively, and the first emitters of said pair of transistors being connected together,
   2. an emitter impedance element connected at one end thereof to the commonly connected first emitters of said pair of transistors, and
   3. a pair of relatively high-valued impedance elements each connected at one end thereof to the collector of a respective one of the pair of transistors, respectively;

b. a pair of digit lines for said memory cell connected to the second emitters of said pair of transistors, respectively;

c. a source of a constant emitter bias voltage connected to the other end of said emitter impedance element;

d. an address line for said memory cell; and e. a source of an address voltage connected to said address line, said address voltage presenting a high or a low level when the corresponding memory cell is to be selected or non-selected, respectively;

the improvement which comprises:

a switching transistor having a collector, a base and double-emitters; and a pair of relatively low-valued impedance elements each having a relatively low-valued impedance with respect to that of said high-valued impedance elements and connected between one of the double-emitters of said switching transistor and the collector of one of said pair of transistors, respectively;

the base of said switching transistor being connected to said address line, said address voltage of the high or the low level rendering said switching transistor conductive or non-conductive, respectively, so that the low-valued impedance elements are loaded in the collector circuits of said pair of transistors concurrently when the address voltage presents the high level.

2. The combination according to claim 1, wherein said high-valued impedance elements are resistors having respectively a relatively high-valued resistance, and said low-valued impedance elements are resistors having respectively a relatively low-valued resistance with respect to that of said high-valued impedance elements.

3. The combination according to claim 1 which further comprises a source of a constant collector bias voltage connected to the collector of said switching transistor.

4. The combination according to claim 3 which further comprises means for connecting the source of the constant collector bias voltage to the other ends of the high-valued impedance elements, respectively.

5. The combination according to claim 3 which further comprises means for connecting said address line to the other ends of said high-valued impedance elements, respectively.

6. An improvement in a semiconductor memory according to claim 1 which further comprises a coupling impedance element connected between the collectors of the pair of transistors for preventing said pair of transistors from saturation.

7. The improvement according to claim 6, wherein said coupling impedance element comprises a pair of Schottky barrier diodes connected in parallel with and in opposite conductive direction to each other.

8. A bipolar semiconductor memory cell comprising:

a. a pair of double-emitter transistors each having collector and base electrodes and first and second emitter electrodes, the collector and base electrodes of each of said pair of transistors being directly cross-coupled to the base and collector electrodes of the other, respectively, the first emitter electrodes of said pair of transistors being connected together so that said pair of transistors attain bistable operation, the second emitter electrodes of said pair of transistors being connected with a pair of digit lines, respectively;

b. an emitter resistor connected at one end thereof with the commonly connected first emitter electrodes and at the other end thereof with a terminal at which a constant potential is applied;

c. a pair of relatively high-valued resistance elements connected respectively with the collector electrodes of said pair of transistors, d. a double-emitter switching transistor having collector, base and two emitter electrodes;

e. a pair of relatively low-valued resistance elements connected between the emitter electrodes of said switching transistor and the collector electrodes of said pair of transistors, respectively;

f. address means for supplying to the base electrode of said switching transistor an address voltage having active and inactive states when the cell is to be selected and non-selected, respectively, the potentials of the address voltage in the active and inactive states being so selected as to render the switching transistor into on and off states of conduction, respectively, g. a first potential source connected with the other ends of said high-valued resistance elements; and h. a second potential source connected with the collector electrode of said switching transistor, so that the collector electrodes of said pair of transistors are supplied with a collector operation potential through the high-valued resistance elements when the cell is non-selected, or through the series circuits of the switching transistor and the low-valued resistance element, which series circuits are shunting the high-valued resistance elements, when the cell is selected.

* * * * *